United States Patent
Heo et al.

(10) Patent No.: US 9,223,450 B2
(45) Date of Patent: Dec. 29, 2015

(54) APPARATUS AND METHOD FOR PROXIMITY TOUCH SENSING

(71) Applicant: Samsung Electronics Co., Ltd., Gyeonggi-do (KR)

(72) Inventors: Hoon-Do Heo, Gyeonggi-do (KR); Jae-Wook Park, Seoul (KR); Jong-Dae Park, Seoul (KR); Heon-Seok Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 156 days.

(21) Appl. No.: 13/912,345

(22) Filed: Jun. 7, 2013

(65) Prior Publication Data
US 2013/0335370 A1    Dec. 19, 2013

(30) Foreign Application Priority Data
Jun. 15, 2012 (KR) .................. 10-2012-0064437

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04107* (2013.01)

(58) Field of Classification Search
CPC .................. G06F 3/0416; G06F 3/044; G06F 2203/04107
USPC .................................................. 345/173–178
See application file for complete search history.

(56) References Cited

U.S. PATENT DOCUMENTS

| | | | |
|---|---|---|---|
| 2005/0236906 A1 | 10/2005 | Morgan et al. | |
| 2010/0120473 A1 | 5/2010 | Oh | |
| 2011/0007021 A1* | 1/2011 | Bernstein et al. | 345/174 |
| 2011/0063247 A1 | 3/2011 | Min | |
| 2011/0279410 A1 | 11/2011 | Han et al. | |
| 2012/0146943 A1* | 6/2012 | Fairley et al. | 345/174 |
| 2013/0015868 A1* | 1/2013 | Peng | 324/688 |
| 2013/0033450 A1* | 2/2013 | Coulson et al. | 345/174 |
| 2013/0162517 A1* | 6/2013 | Gay | 345/156 |
| 2014/0152621 A1* | 6/2014 | Okayama et al. | 345/174 |

FOREIGN PATENT DOCUMENTS

EP        2 418 573 A2    2/2012

* cited by examiner

*Primary Examiner* — Kent Chang
*Assistant Examiner* — Nelson Rosario
(74) *Attorney, Agent, or Firm* — Cha & Reiter, LLC

(57) ABSTRACT

An apparatus performs proximity touch sensing, and includes a shield layer, an electrostatic capacity touch panel disposed with a specific distance above the shield layer, and a proximity touch controller for sensing a non-contact touch by supplying a voltage to the electrostatic capacity touch panel and the shield layer and thus by forming a first capacitance.

17 Claims, 8 Drawing Sheets

APPARATUS AND METHOD FOR PROXIMITY TOUCH SENSING

CLAIM OF PRIORITY

This application claims, pursuant to 35 U.S.C. §119(a), priority to and the benefit of the earlier filing date of a Korean patent application filed in the Korean Intellectual Property Office on Jun. 15, 2012 and assigned Serial No. 10-2012-0064437, the entire disclosure of which is hereby incorporated by reference.

BACKGROUND

1. Field of the Invention

The present disclosure relates to an apparatus and method for proximity touch sensing.

2. Description of the Related Art

With the growing distribution of a portable terminal in recent years, the portable terminal has become necessity of modern life. The portable terminal can provide not only a unique voice telephony service but also a variety of data transmission services and various value-added services, and thus is functionally used as a multimedia communication device. With the increase in services that can be provided by the portable terminal, a user interface (UI) technique for controlling the portable terminal has been continuously developed.

A portable terminal employing a proximity sensor has been launched in the prior art. The portable terminal performs a specific function by recognizing whether a user is proximate to the portable terminal A representative example of the proximity sensor of the prior art includes a photodiode-based proximity sensor. The proximity sensor includes a light emitting unit and a light receiving unit. In general, the light emitting unit consists of a Light Emitting Diode (LED), and the light receiving unit consists of a photodiode. When the light emitting unit projects a light beam, the projected light beam is reflected by an object proximate to the proximity sensor, and the reflected light beam is delivered to the light receiving unit. The light receiving unit absorbs the delivered light beams and thus recognizes that the object is proximate to the proximity sensor.

A representative function of the portable terminal using the proximity sensor includes a screen lock function and a screen unlock function. However, since the proximity sensor simply determines whether a user is proximate to the portable terminal, a function of the portable terminal utilizing the proximity sensor is inevitably limited.

SUMMARY

An aspect of the present invention is to solve at least the above-mentioned problems and/or disadvantages and to provide at least the advantages described below. Accordingly, an aspect of the present invention is to provide a proximity touch sensing apparatus and method capable of sensing a non-contact touch by using an electrostatic capacity touch panel.

Another aspect of the present invention is to provide a proximity touch sensing apparatus and method capable of changing a shield layer for noise shielding of a display to a Transmit (Tx) channel that forms a capacitance for non-contact touch sensing.

Another aspect of the present invention is to provide a proximity touch sensing apparatus and method for configuring at least one of x-electrode lines and y-electrode lines of an electrostatic capacity touch panel as a Receive (Rx) channel that forms a capacitance for non-contact touch sensing.

Another aspect of the present invention is to provide a proximity touch sensing apparatus and method capable of mutually changing contact touch sensing and non-contact touch sensing.

Another aspect of the present invention is to provide a proximity touch sensing apparatus and method for sensing a non-contact touch by configuring an electrostatic capacity touch panel as an Rx channel, configuring a shield layer for noise shielding and disposed below the electrostatic capacity touch panel as a Tx channel, and forming an electric field between the electrostatic capacity touch panel and the shield layer.

In accordance with a first aspect of the present invention, an apparatus for proximity touch sensing is provided. The apparatus includes a shield layer, an electrostatic capacity touch panel disposed with a specific distance above the shield layer, and a proximity touch controller for sensing a non-contact touch by supplying a voltage to the electrostatic capacity touch panel and the shield layer and thus by forming a first capacitance.

In accordance with a second aspect of the present invention, a touch screen device includes a display, a shield layer configured on the display, an electrostatic capacity touch panel deployed above the display, and a proximity touch controller for sensing a non-contact touch by supplying a voltage to the electrostatic capacity touch panel and the shield layer and thus by forming a first capacitance and for sensing the contact touch by operating the shield layer as a noise shielding ground and by supplying a voltage to the electrostatic capacity touch panel and thus by forming a second capacitance.

In accordance with a third aspect of the present invention, a method for proximity touch sensing is provided. The method includes configuring an electrostatic capacitor touch panel as an Rx channel, changing a shield layer disposed with a specific distance below the electrostatic capacity touch panel from a noise shielding ground to a Tx channel, and sensing a non-contact touch by supplying a voltage to the Tx channel and the Rx channel and thus by forming a first capacitance.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION

Exemplary embodiments of the present invention will be described herein below with reference to the accompanying drawings. In the following description, well-known functions or constructions are not described in detail since they would obscure the invention in unnecessary detail. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

The same reference numbers are used throughout the drawings to refer to the same or like parts. Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, a "non-contact touch" is an event which is detected as a touch to a touch screen or other touch-sensitive devices but which does not have any actual physical contact.

Among the terms set forth herein, an x-electrode line is an electrode line which is parallel or substantially parallel to an x-axis, and a y-electrode line is an electrode line which is parallel or substantially parallel to a y-axis.

Although the portable terminal is illustrated in the accompanying drawings and a proximity touch sensing apparatus using an electrostatic capacity touch screen is illustrated and described, the present invention is not limited thereto. For example, the present invention is also applicable to various other known electronic devices including the electrostatic capacity touch screen, such as automatic teller machines (ATMs).

Figure 1:
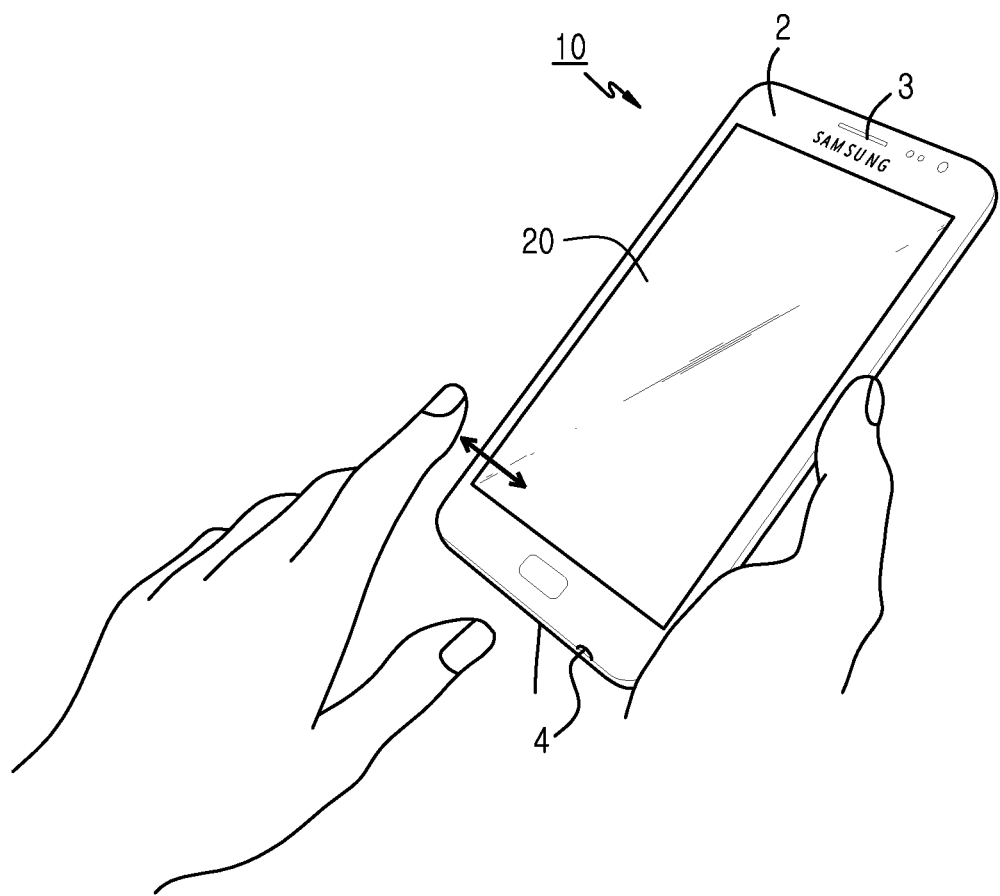
FIG. 1 is a perspective view of a portable terminal which employs a proximity sensing apparatus according to an exemplary embodiment of the present invention.

FIG. 1 is a perspective view of a portable terminal which employs a proximity sensing apparatus according to an exemplary embodiment of the present invention.

A touch screen device 20 including an electrostatic capacity touch panel is disposed on a front surface 2 of a portable terminal 10. The touch screen device 20 can simultaneously support data input and output functions, and if the technical features of the present invention are applied, can sense a proximity touch. The proximity touch includes both a contact touch and a non-contact touch on the touch screen.

A speaker 3 for outputting an audible sound corresponding to an electric signal by converting the electric signal into an audible frequency band is disposed on an upper portion of the touch screen device 20, and a microphone 4 for converting a sound wave delivered from a human user or other sound sources into an electric signal is disposed on a lower portion of the touch screen device 20.

Figure 2:
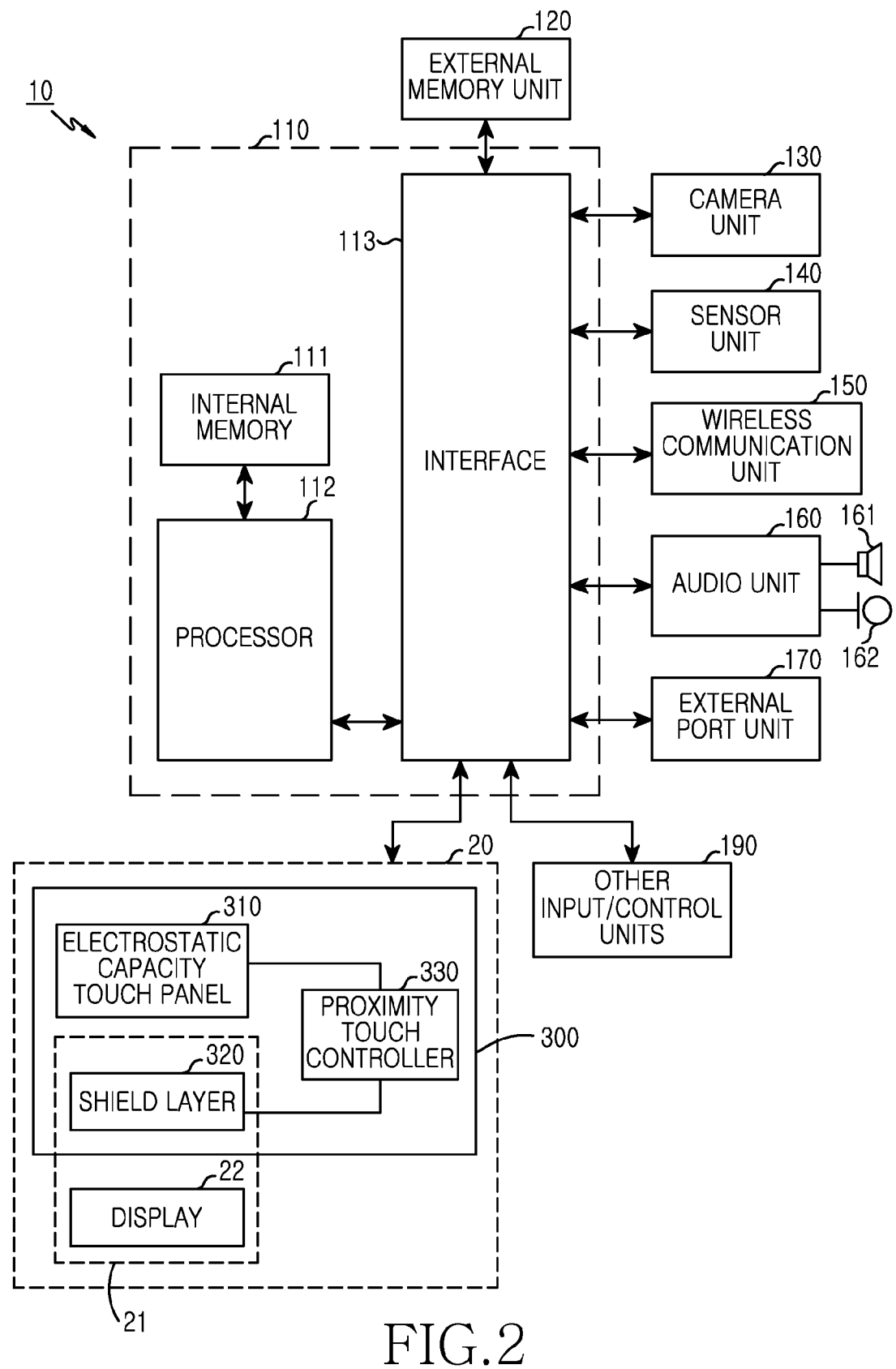
FIG. 2 is a block diagram of the portable terminal which employs a proximity sensing device according to the exemplary embodiment of the present invention.

FIG. 2 is a block diagram of the portable terminal 10 which employs a proximity sensing device according to the exemplary embodiment of the present invention.

The portable terminal 10 may be a mobile phone, a mobile pad, a media player, a tablet computer, a handheld counter, or a Personal Digital Assistant (PDA). In addition, the portable terminal 10 may be any portable terminal including a device which combines two or more functions among the aforementioned devices.

The portable terminal 10 includes a host unit 110, an external memory unit 120, a camera unit 130, a sensor unit 140, a wireless communication unit 150, an audio unit 160, an external port unit 170, a touch screen unit as the touch screen device 20, and other input/control units 190. The memory unit 120 and the external port unit 170 may be plural in number.

The host unit 110 includes an internal memory 111, one or more processors 112, and an interface 113. The internal memory 111, the one or more processors 112, and the interface 113 may be separate components or may be configured in one or more Integrated Circuits (ICs).

The processor 112 performs several functions for the portable terminal 10 by executing various software programs, and processes and controls audio communication, video communication, and data communication. Further, in addition to typical functions, the processor 112 executes a software module (or an instruction set) stored in the internal memory 111 and/or the external memory unit 120 and thus performs various functions corresponding to the software module. That is, the processor 112 performs the method according to the exemplary embodiment of the present invention by operating with the software module stored in the internal memory 111 and/or the external memory unit 120. The processor 112 may include one or more data processors, an image processor, and/or a COder/DECoder (CODEC). Further, the portable terminal 10 may separately configure the data processor, the image processor, or the CODEC.

The interface 113 connects the host unit 110 to several units of the portable terminal 10.

The camera unit 130 can perform a camera function such as photographing, video clip recording, etc. The camera unit 130 may include a Charge Coupled Device (CCD), a Complementary Metal-Oxide-Semiconductor (CMOS), etc. In addition, the camera unit 130 adjusts a change in a hardware configuration, e.g., a lens movement, an aperture number F, etc.

Various components of the portable terminal 10 can be connected through one or more communication buses or stream lines, represented by the lines and arrows between components in FIG. 2.

The sensor unit 140 may include a motion sensor, an optical sensor, a temperature sensor, etc., and enables several functions. For example, a motion sensor can sense a motion of the portable terminal 10, and an optical sensor can sense an ambient light.

The wireless communication unit 150 enables wireless communication, and can include a radio frequency transmitter/receiver and an optical and/or infrared transmitter/receiver. The wireless communication unit 150 can be designed to operate by using one of a Global System for Mobile communications (GSM) network, an Enhanced Data Rates for GSM Evolution (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a WI-FI network using a wireless technology for data exchange over a computer network commercially available from the WI-FI ALLIANCE, a WiMax network, and/or a BLUETOOTH network using a short range wireless communications technology at the 2.4 GHz band, commercially available from the BLUETOOTH SPECIAL INTEREST GROUP, INC. according to a communication network.

The audio unit 160 is connected to the speaker 161 and the microphone 162, as the speaker 3 and microphone 4, respectively, in FIG. 1, and performs an audio input and/or output function of voice recognition, voice recording, digital recording, telephony, etc. That is, the audio unit 160 communicates with a user via the speaker 161 and the microphone 162. In addition, the audio unit 160 receives a data signal from the host unit 110, converts the received data signal into an electric signal, and outputs audible sound corresponding to the converted electric signal via the speaker 161. The speaker 161 outputs the audible sound corresponding to the electric signal by converting the electric signal into an audible frequency band. The microphone 162 converts a sound wave delivered from a human user or other sound sources into an electric signal. In addition, the audio unit 160 receives an electric signal from the microphone 162, converts the received electric signal into an audio data signal, and transmits the converted audio data signal to the host unit 110. The audio unit 160 may include an earphone, headphone, or headset attachable to or detachable from the portable terminal 10.

The external port unit 170 connects the portable terminal 10 directly to another portable terminal, or connects the portable terminal 10 indirectly to another potable terminal via a network (e.g., an Internet, an intranet, a wireless Local Area Network (LAN), etc.).

The touch screen unit 20 provides an input and output interface between the portable terminal 10 and the user. The touch screen unit 20 applies a touch sensing technique, delivers a touch input of the user to the host unit 110, and shows visual information (e.g., text, graphic, video, etc.) provided from the host unit 110 to the user. Further, the touch screen unit 20 may further apply not only a capacitance, resistance, infrared ray, and surface acoustic wave (SAW) technique but also any multi-touch sensing technique including other proximity sensor deployments or other elements.

The touch screen unit 20 includes a display unit 21 and a proximity touch sensing unit 300. The display unit 21 includes a display 22 and a shield layer 320. The display 22 outputs an image under the control of the host unit 110. The shield layer 320 is laminated on the display 22, and shields a noise generated from the touch screen unit 20.

The proximity touch sensing unit 300 includes an electrostatic capacity touch panel 310, the shield layer 320, and a proximity touch controller 330. The electrostatic capacity touch panel 310 is disposed in a predetermined direction from the shield layer 320, for example, vertically above the shield layer 320, relative to the view of the touch screen unit 20 in FIG. 1, and deploys x-electrode lines and y-electrode lines for forming a capacitance. As described above, the shield layer 320 is configured in the display 22 to shield a noise. The proximity touch controller 330 senses a signal representing a proximity touch generated on the electrostatic capacity touch panel 310, and transmits the signal to the host unit 110. The proximity touch includes both a contact touch and a non-contact touch of the touch panel 310. The sensing of a non-contact touch includes a proximity recognition method known in the art implemented, for example, by the host unit 110, and includes sensing various proximity gestures. The non-contact touch is not limited to simple proximity sensing. The proximity touch controller 330 includes an analog-to-digital converter, known in the art, to sense a proximity touch on the electrostatic capacity touch panel 310.

The proximity touch controller 330 has a configuration for proximity touch sensing, which will be described below with reference to the accompanying drawings.

The other input/control units 190 may include, for example, an up/down button for a volume control. In addition thereto, the other input/control units 190 may include at least one of pointer units such as a push button, a locker button, a locker switch, a thumb-wheel, a dial, a stick, a stylus, etc., to which corresponding functions are assigned.

The external memory unit 120 may include a fast random access memory such as one or more magnetic disc storage devices and/or a non-volatile memory, one or more optical storage devices, and/or a flash memory (e.g., NAND, NOR).

The external memory unit 120 stores a software element. The software element may include an operating system module, a communication module, a graphic module, a user interface module, a CODEC module, a camera module, one or more application modules, and a proximity touch module. The "module" may also include a set of instructions, an instruction set, or a program.

The operating system module is a built-in operating system such as WINDOWS which is an operating system commercially available from MICROSOFT CORPORATION, as well as LINUX, Darwin, RTXC, UNIX, OS X, or VxWorks, and may include various software components for controlling a general system operation. The control of the general system operation may include memory management and control, storage hardware (device) control and management, power control and management, etc. In addition, the operating system module performs a function for facilitating communication between various hardware elements (devices) and software elements (modules).

The communication module may enable communication with a peer portable terminal such as a computer, a server, a portable terminal, etc., via the wireless communication unit 150 or the external port unit 170.

The graphic module may include various software components for providing and displaying graphics on the touch screen unit 20. The term "graphics" may include a text, a web page, an icon, a digital image, a video, an animation, etc.

The user interface module may include various software components related to a user interface. In addition, the user interface module may include the content related to a way of changing a state of the user interface and a specific condition in which the state of the user interface changes.

The CODEC module may include a software component related to encoding and decoding of a video file.

The camera module may include a camera-related software component which enables camera-related processes and functions.

The application module may include applications and programs implementing a browser, an e-mail system, an instant message system, word processing, a keyboard emulation system, an electronic address book, an electronic contact list, a widget, a Digital Right Management (DRM) system, voice recognition, voice recording, a location determination function, a location-based service, etc. In addition to the aforementioned modules, the memory may further include additional modules (instructions).

In particular, the proximity touch module, implemented by the proximity touch controller 330 and/or software operated by the processor 112 according to the present invention can configure the electrostatic capacity touch panel 310 as a receive (Rx) channel, change the shield layer 320 disposed at a specific distance below the electrostatic capacity touch panel 310 from a noise shielding ground to a transmit (Tx) channel, and sense a non-contact touch by supplying a voltage to the Tx channel and the Rx channel to form a first capacitance. In addition, the proximity touch module can change the shield layer 320 from the Tx channel to the noise shielding ground, and can sense a contact touch by supplying a voltage to the electrostatic capacity touch panel 310 and thus by forming a second capacitance.

Figure 3:
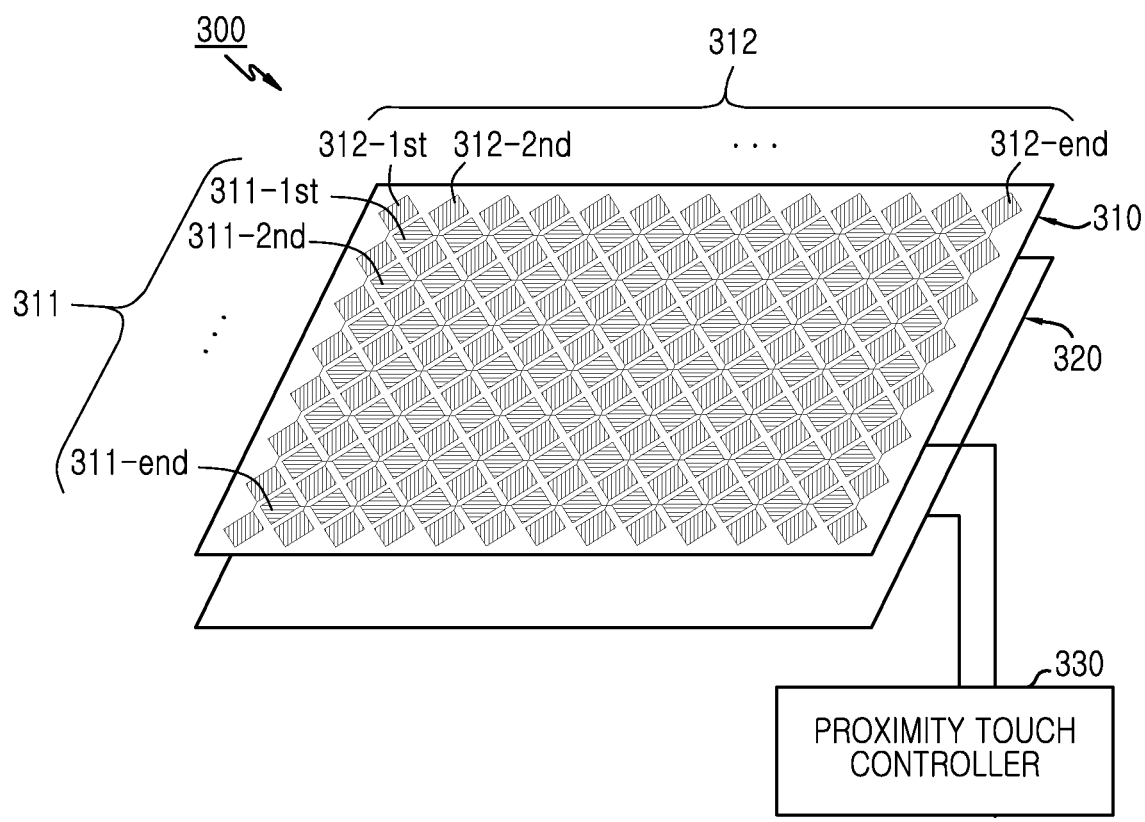
FIG. 3 illustrates an example configuration of a proximity touch sensing apparatus according to the exemplary embodiment of the present invention.

In addition, various functions of the portable terminal 10 of the present invention can be performed by using at least one stream processing and/or a hardware component including an Application Specific Integrated Circuit (ASIC) and/or a software component and/or a combination thereof FIG. 3 illustrates an example configuration of a proximity touch sensing apparatus according to the exemplary embodiment of the present invention.

Referring to FIG. 3, a proximity touch sensing apparatus 300 includes the electrostatic capacity touch panel 310, the shield layer 320, and the proximity touch controller 330.

The electrostatic capacity touch panel 310 includes x-electrode lines 311 deployed to extend in a first direction and spaced equidistantly from each other, and y-electrode lines 312 electrically insulated from the x-electrode lines 311, and with the y-electrode lines 312 deployed to extend in a second direction and spaced equidistantly from each other, with the first and second directions being perpendicular or substantially perpendicular. The x-electrode lines may be labeled as 311-1st, 311-2nd, etc. to 311-end, representing the first, second, intermediate, and last x-electrode lines, respectively. Similarly, the y-electrode lines may be labeled as 312-1st, 312-2nd, etc. to 312-end, representing the first, second, intermediate, and last y-electrode lines, respectively.

The shield layer 320 is disposed in a predetermined direction, such as a vertical direction, at a specific distance from the electrostatic capacity touch panel 310, for example, below the electrostatic capacity touch panel 310. According to the present invention, the shield layer 320 is a noise shielding ground or an electrode which forms a capacitance for sensing a non-contact touch.

The proximity touch controller 330 is electrically connected to the electrostatic capacity touch panel 310 and the shield layer 320, and can control the following two operations for proximity touch sensing.

First, the proximity touch controller 330 generates a capacitance for contact touch sensing by using the electrostatic capacity touch panel 310. The proximity touch controller 330 configures the x-electrode lines 311 of the proximity touch controller 330 as the Transmit (Tx) channel, configures the y-electrode lines 312 as the Receive (Rx) channel, and forms a capacitance by supplying a voltage to the Tx channel and the Rx channel. In this case, if a conductor (e.g., a finger) is in contact with the electrostatic capacity touch panel 310, the proximity touch controller 330 generates and transmits a signal representing a contact touch to the host unit 110.

Second, the proximity touch controller 330 generates a capacitance for non-contact touch sensing by using the electrostatic capacity touch panel 310 and the shield layer 320. The proximity touch controller 330 changes the shield layer 320 from a noise shielding ground to be a Tx channel to be an electric field generating electrode, and configures at least one electrode line of the electrostatic capacity touch panel 310 to be an Rx channel. In addition, the proximity touch controller 330 forms a capacitance by supplying a voltage to the Tx channel and the Rx channel. In this case, if there is a non-contact touch in which a conductor is brought within a predetermined threshold distance of the electrostatic capacity touch panel 310, the proximity touch controller 330 generates and transmits a signal representing a non-contact touch to the host unit 110.

Accordingly, as a user brings a finger or other conducting member into proximity with the touch screen device or unit 20, the present invention senses a varying in the capacitance as a variable quantity, and generates and transmits a corresponding electrical signal to the host unit 110 representing a detected proximity of the finger or member near the touch screen device or unit 20.

Figure 4:
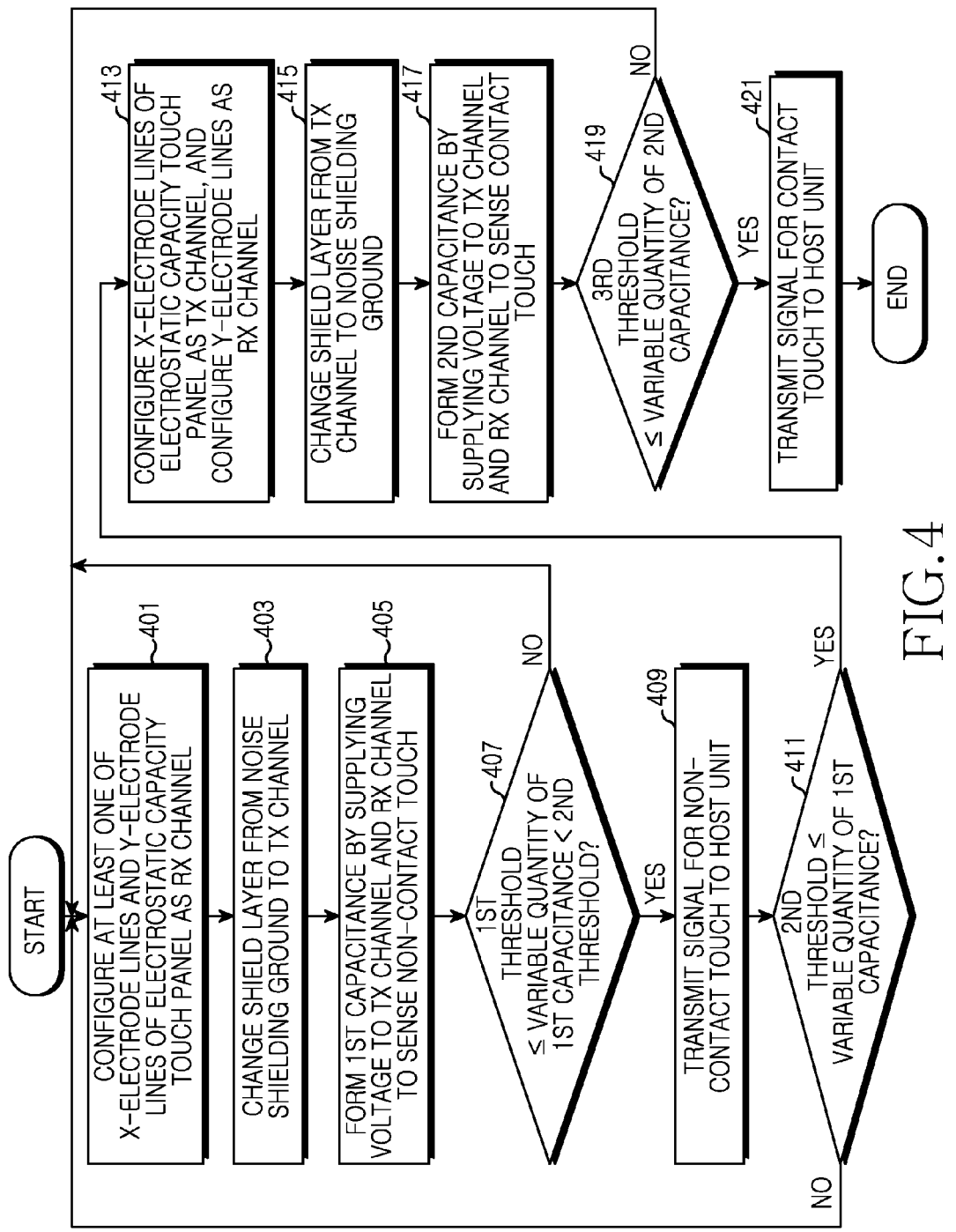
FIG. 4 is a flowchart of a proximity touch sensing process according to the exemplary embodiment of the present invention.

FIG. 4 is a flowchart of a proximity touch sensing process according to the exemplary embodiment of the present invention.

Referring to FIG. 4, in step 401, the proximity touch controller 330 configures at least one of the x-electrode lines and the y-electrode lines of the electrostatic capacity touch panel 310 as an Rx channel.

In step 403, the proximity touch controller 330 changes the shield layer 320 from a noise shielding ground to a Tx channel.

In step 405, the proximity touch controller 330 forms a first capacitance by supplying a voltage to the Tx channel and the Rx channel to sense a non-contact touch.

If a variable quantity of the first capacitance is greater than or equal to a first threshold and is less than a second threshold in step 407, the method proceeds to step 409, and the proximity touch controller 330 generates and transmits a signal representing a non-contact touch to the host unit 110. Otherwise, if the condition of step 407 is not satisfied, the proximity touch controller 330 loops back to step 401 and performs the step 401 and its subsequent steps.

After step 409, if the variable quantity of the first capacitance is greater than or equal to the second threshold in step 411, the method proceeds to step 413, in which the proximity touch controller 330 configures the x-electrode lines 311 of the electrostatic capacity touch panel as a Tx channel, and configures the y-electrode lines 312 as an Rx channel. Otherwise, if the condition of step 411 is not satisfied, the proximity touch controller 330 loops back to step 401 and performs the step 401 and its subsequent steps.

After step 413, the method performs step 415, in which the proximity touch controller 330 changes the shield layer 320 from a Tx channel to a noise shielding ground.

In step 417, to sense a contact touch, a second capacitance is formed by supplying a voltage to the Tx channel and the Rx channel.

In step 419, if the variable quantity of the second capacitance is greater than or equal to a third threshold, the method proceeds to step 421, in which the proximity touch controller 330 generates and transmits a signal representing a contact touch to the host unit 110, and the method of FIG. 4 then ends. However, in step 419, if the condition of step 419 is not satisfied, the proximity touch controller 330 loops back to step 401 and performs the step 401 and its subsequent steps.

Figure 5:
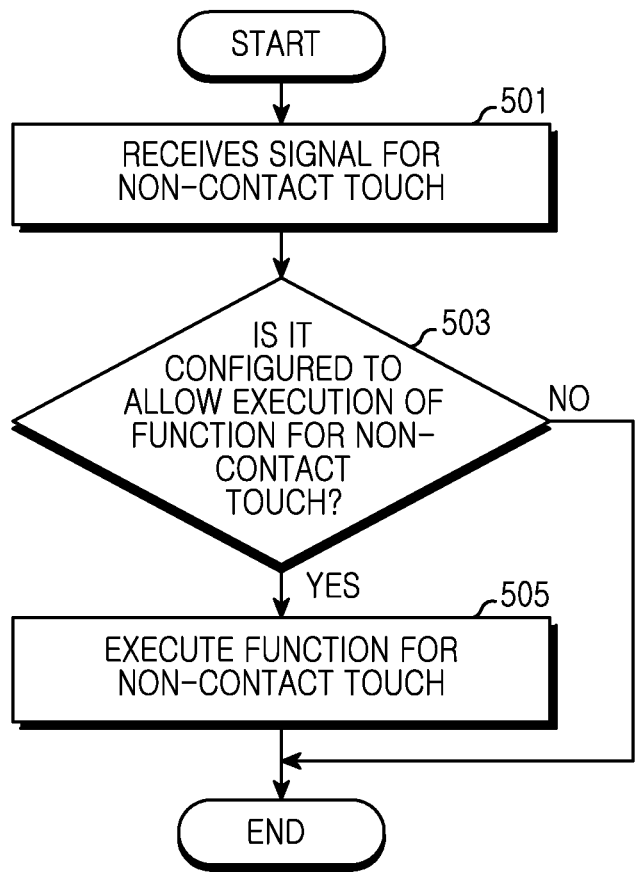
FIG. 5 is a flowchart of a process of operating a host unit for a non-contact touch signal.

FIG. 5 is a flowchart of a process of operating the host unit 110 for a non-contact touch signal.

Referring to FIG. 5, in step 501, the host unit 110 receives a signal representing a non-contact touch from the proximity touch controller 330.

In step 503, the present invention determines whether the host unit 110 is configured to allow the execution of a function for a non-contact touch. For example, a user may predetermine and set the terminal 10 not to execute the function for the non-contact touch, or alternatively, may predetermine and set the terminal 10 to execute the function for the non-contact touch.

If it is determined in step 503 to allow the execution of the function for the non-contact touch, the method proceeds to step 505, and the host unit 110 executes the function for the non-contact touch. The method of FIG. 5 then ends.

Otherwise, if it is determined in step 503 not to allow the execution of the function for the non-contact touch, the host unit 110 does not execute the function for the non-contact touch, so the method skips step 505, and then the method of FIG. 5 ends.

The procedure of FIG. 5 is related to processing of a signal generated in the process of performing the present invention, in particular, step 409 of FIG. 4, for a change from the configuration of sensing the non-contact touch to the configuration of sensing the contact touch of the exemplary embodiment of FIG. 4.

In addition, if a signal representing the contact touch is received from the proximity touch controller 330, the host unit 110 executes a corresponding function for the contact touch in a manner known in the art for processing touch events on the touch screen device or unit 20.

Figure 6A:
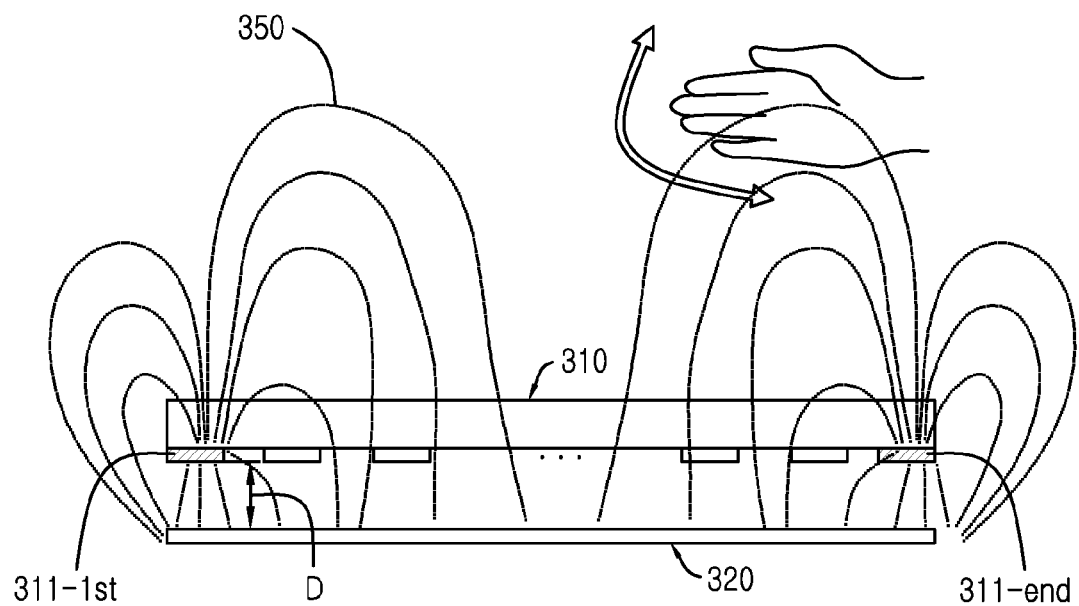
FIGS. 6A, 6B and 6C illustrate non-contact touch sensing according to the exemplary embodiment of the present invention.
Figures 6B, 6C:
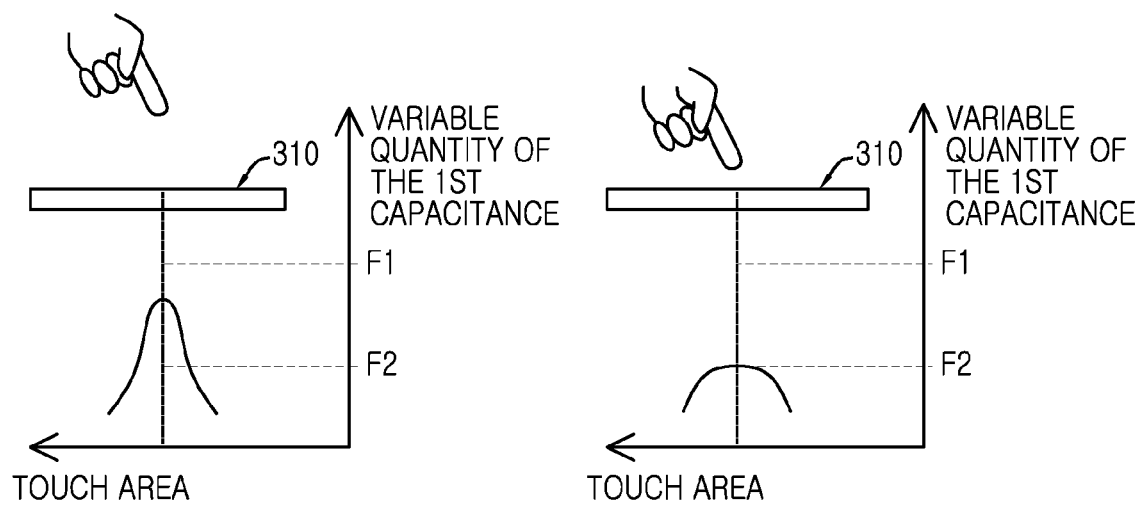

FIGS. 6A-6C illustrate non-contact touch sensing according to the exemplary embodiment of the present invention. This is an example of generating an electric field by configuring a first x-electrode line 311-1st and a last x-electrode line 311-end of the electrostatic capacity touch panel 310, as shown in FIG. 3, as an Rx channel.

Referring to FIG. 6A, the proximity touch sensing unit 300 according to the exemplary embodiment of the present invention configures the electrostatic capacity touch panel 310 as an Rx channel, and configures the shield layer 320 disposed below the electrostatic capacity touch panel 310, spaced a specific predetermined distance D from the electrostatic capacity touch panel 310, as a Tx channel. When a voltage is supplied to the Tx channel and the Rx channel, the electric field 350 for sensing a non-contact touch is formed, so that a user moving a hand, finger, or other member into the electric field 350 changes the capacitance and so is detected by the proximity touch controller 330, which generates and transmits a corresponding electric signal to the host unit 110, in a manner known in the art for touch screens.

A capacitance (i.e., electrostatic capacity) shown in FIG. 6A is a projected capacitance represents energy related to the electric field 350. The greater the capacitance, the more advantageous the non-contact touch sensing. However, the following aspects are preferably considered for optimal non-contact touch sensing.

The capacitance is in proportion to a permittivity and an electrode area, and is in inverse proportion to a distance between two electrodes. Therefore, the number of electrode lines used to constitute the Rx channel in the electrostatic capacity touch panel 310 and specific positions of electrode lines 311, 312 to be selected are used as values for determining the capacitance. In addition, since the shield layer 320, which typically has a relatively wider area than that of an electrode of a typical touch panel, is configured as a Tx channel in the present invention, the capacitance can be increased. Further, a distance D between the electrostatic capacity touch panel 310 and the shield layer 320 is used as a value for determining the capacitance. The smaller the distance D is, the higher the capacitance is. Meanwhile, although the capacitance is decreased when the distance D between the electrostatic capacity touch panel 310 and the shield layer 320 is increased, since a variable quantity of the capacitance is small in regards to detecting proximity of a conductor, the variable quantity can be considered when determining sensitive non-contact touch sensing. That is, since relatively small changes in the capacitance may be detected using the present invention, relative spacing and sizing of components may be reduced without significant loss of detectable changes in the capacitance.

Referring to FIG. 6B, if a hand, finger, or other member of a user is brought to within a specific distance from the electrostatic capacity touch panel 310, a variable quantity of a first capacitance is reduced, and reaches and drops below a first threshold F 1, and the proximity touch controller 330 generates and transmits a signal representing a non-contact touch to the host unit 110.

In addition, referring to FIG. 6C, if the hand is brought closer to the electrostatic capacity touch panel 310, the variable quantity of the first capacitance is reduced, and reaches and drops below a second threshold F2, and the proximity touch controller 330 changes the shield layer 320 from an electric field generating electrode to a noise shielding ground, so that if the hand, finger, or other member is brought into contact with the electrostatic capacity touch panel 310, the present invention senses a contact touch by generating an electric field by using only the electrostatic capacity touch panel 310.

Figure 7A:
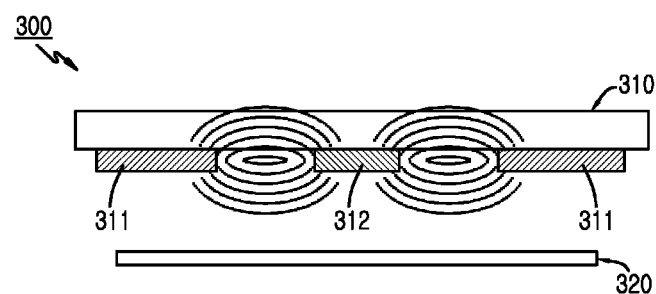
FIGS. 7A and 7B illustrate contact touch sensing according to the exemplary embodiment of the present invention.
Figure 7B:
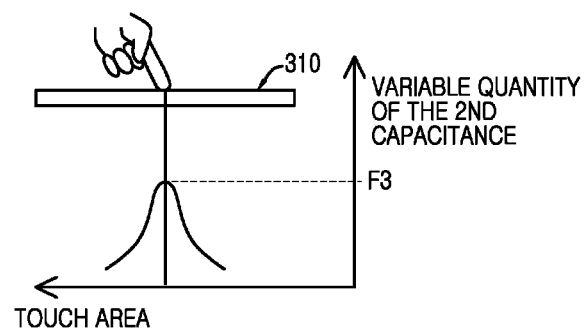

FIGS. 7A-7B illustrate contact touch sensing according to the exemplary embodiment of the present invention.

If an electric field is generated by using the electrostatic capacity touch panel 310 and the shield layer 320, as shown in FIG. 6A, and a variable quantity of a first capacitance is reduced by the presence of a conducting member, such as a finger, and the variable quantity reaches a second threshold F2, as shown in FIG. 6C, the proximity touch controller 330 generates an electric field by using x-electrodes 311 and y-electrodes 312 of the electrostatic capacity touch panel 310, as shown in FIG. 3, and changes the shield layer 320 from an electric field forming electrode to a noise shielding ground, as shown in FIG. 7A.

If a hand, finger, or other member of the user is then brought to contact the electrostatic capacity touch panel 310, as shown in FIG. 7B, a variable quantity of a second capacitance of the electrostatic capacity touch panel 310 is greater than or equal to a third threshold F3, and the proximity touch controller 330 generates and transmits a signal representing the contact touch to the host unit 110.

It is understood that the switching between non-contact touch sensing and contact touch sensing is reversible, so that as the user moves a hand, finger, or other conducting member off of and away from the electrostatic capacity touch panel 310, the proximity touch controller 330 senses changes in the variable quantities of the first and second capacitances being below or above the appropriate thresholds F1, F2, F3 to change the terminal 10 and/or its touch screen device or unit 20 from contact touch sensing to non-contact touch sensing, depending on the distance of the hand or other member from the surface of the electrostatic capacity touch panel 310.

Figure 8:
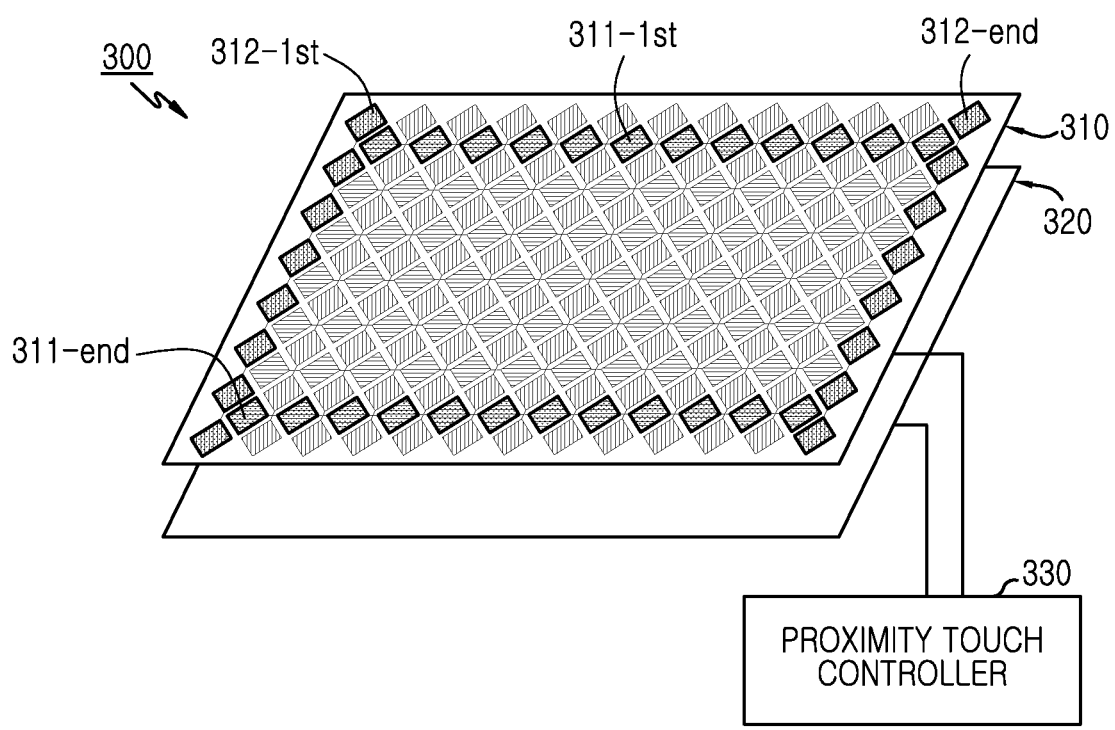
FIG. 8 illustrates electrode lines selected as a Receive (Rx) channel in an electrostatic capacity touch panel for non-contact touch sensing according to the exemplary embodiment of the present invention.

FIG. 8 illustrates electrode lines selected as an Rx channel in the electrostatic capacity touch panel 310 for non-contact touch sensing according to the exemplary embodiment of the present invention.

In the present invention, when an Rx channel for forming an electric field is determined in association with the shield layer 320 configured as a Tx channel, at least one electrode line of the electrostatic capacity touch panel 310 is selectively determined to form an optimal electrode line for non-contact touch sensing.

In the exemplary embodiment of the present invention of FIG. 8, a first x-electrode 311-1st, a last x-electrode line 311-end, a first y-electrode line 312-1st, and a last y-electrode line 312-end are selected to be an Rx channel deployed to an outermost part of the electrostatic capacity touch panel 310, with the electrode lines 311-1st, 311-end, 312-1st, and 312-end depicted with additional shading in FIG. 8 to illustrate the Rx channel in the outermost part of the electrostatic capacity touch panel 310.

In conclusion, a proximity touch sensing apparatus and method according to the present invention implement a touch area of an electrostatic capacity touch panel as an area for non-contact touch sensing without being limited to simple proximity determination. Therefore, various proximity gestures, e.g., a palm recognition, a finger swiper, etc., can be detected.

In addition, the present invention configures an electrostatic capacity touch panel and a shield layer for noise shielding of a display as an apparatus for generating an electric field. Therefore, electrode lines of the electrostatic capacity touch panel can be selectively used, and a distance between the electrostatic capacity touch panel and the shield layer can be regulated to generate an electric field for optimal non-contact touch sensing using projected capacitance.

Furthermore, the present invention uses a shield layer for noise shielding of a pre-configured display as an apparatus for generating an electric field for non-contact touch sensing, which leads to cost reduction in fabricating the terminal 10.

In addition, the present invention can mutually change between contact-touch sensing and non-contact-touch sensing by using a touch screen, thereby increasing usability of the touch screen.

The above-described apparatus and methods according to the present invention can be implemented in hardware or firmware, or as software or computer code, or combinations thereof In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An apparatus for proximity touch sensing, the apparatus comprising:
    a shield layer;
    an electrostatic capacity touch panel spaced apart from the shield layer; and
    a proximity touch controller for sensing a non-contact touch by:
        configuring the shield layer as a transmit (Tx) channel and the electrostatic capacity touch panel as a receive (Rx) channel,
        supplying a voltage to the Tx channel of the shield layer and the Rx channel of the electrostatic capacity touch panel for forming a first capacitance, and
        detecting the non-contact touch using a variation in the first capacitance,
        wherein if a variable quantity of the first capacitance reaches a threshold, the proximity touch controller changes the shield layer to operate as a noise shielding ground, and senses a contact touch by supplying a voltage to the electrostatic capacity touch panel for forming a second capacitance and detecting the contact touch using a variation in the second capacitance.

2. The apparatus of claim 1, wherein the proximity touch controller is further for sensing a contact touch by:
    changing the shield layer from the Tx channel to a noise shielding ground, and
    supplying a voltage to the electrostatic capacity touch panel to form a second capacitance and detect a variation in the second capacitance corresponding to the contact touch.

3. The apparatus of claim 2, wherein if the non-contact touch is sensed, the proximity touch controller does not operate the shield layer as the noise shielding ground.

4. The apparatus of claim 2,
    wherein the electrostatic capacity touch panel includes x-electrode lines deployed to extend in a first direction, and y-electrode lines electrically insulated from the x-electrode lines and deployed to extend in a second direction substantially perpendicular to the first direction; and
    wherein the proximity touch controller forms the second capacitance by supplying a voltage to the x-electrode lines and the y-electrode lines.

5. The apparatus of claim 1, wherein if a variable quantity of the first capacitance reaches a threshold, the proximity touch controller generates and outputs a signal representing the non-contact touch.

6. The apparatus of claim 5, further comprising a host unit, wherein the host unit receives the signal representing the non-contact touch from the proximity touch controller, and performs a function for the received signal.

7. The apparatus of claim 1,
    wherein the electrostatic capacity touch panel includes:
        x-electrode lines extending in a first direction, y-electrode lines, electrically insulated from the x-electrode lines and extending in a second direction substantially perpendicular to the first direction, and wherein the proximity touch controller further configures at least one of the x-electrode lines and the y-electrode lines as the Rx channel.

8. The apparatus of claim 7, wherein the proximity touch controller configures a first x-electrode line, a last x-electrode line, a first y-electrode line, and a last y-electrode line of the electrostatic capacity touch panel as the Rx channel.

9. A touch screen device comprising:
a display;
a shield layer configured on the display;
an electrostatic capacity touch panel spaced above the shield layer; and
a proximity touch controller for:
sensing a non-contact touch by supplying a voltage to the electrostatic capacity touch panel and the shield layer for forming a first capacitance and detecting the non-contact touch using a variation in the first capacitance sensing a contact touch by operating the shield layer as a noise shielding ground, supplying a voltage to the electrostatic capacity touch panel for forming a second capacitance and detecting the contact touch using a variation in the second capacitance,
wherein if a variable quantity of the first capacitance reaches a threshold, the proximity touch controller changes the shield layer to operate as a noise shielding ground, and senses a contact touch by supplying a voltage to the electrostatic capacity touch panel for forming a second capacitance and detecting the contact touch using a variation in the second capacitance.

10. The touch screen device of claim 9, wherein if a variable quantity of the first capacitance reaches a threshold, the proximity touch controller generates an output signal representing the non-contact touch.

11. The touch screen device of claim 9,
wherein the electrostatic capacity touch panel includes x-electrode lines deployed to extend in a first direction, and y-electrode lines electrically insulated from the x-electrode lines and deployed to extend in a second direction substantially perpendicular to the first direction; and
wherein the proximity touch controller forms the first capacitance by supplying a voltage to the shield layer and at least one of the x-electrode lines and the y-electrode lines of the electrostatic capacity touch panel.

12. The touch screen device of claim 11, wherein the proximity touch controller forms the first capacitance by supplying a voltage to the shield layer and to a first x-electrode line, a last x-electrode line, a first y-electrode line, and a last y-electrode line of the electrostatic capacity touch panel.

13. A method for proximity touch sensing, the method comprising:
configuring an electrostatic capacitor touch panel as a receiver (Rx) channel;
changing a shield layer from operating as a noise shielding ground to operating as a transmit (Tx) channel, the shield layer spaced apart from the electrostatic touch panel;
sensing a non-contact touch by supplying a voltage to the Tx channel of the shield layer and the Rx channel of the electrostatic capacitor touch panel to form a first capacitance and detecting the non-contact touch using a variation in the first capacitance;
changing the shield layer from operating as the Tx channel to operating as a noise shielding ground, when a variable quantity of the first capacitance reaches a threshold; and
sensing a contact touch by supplying a voltage to the electrostatic capacity touch panel for forming a second capacitance, and detecting the contact touch using a variation in the second capacitance.

14. The method of claim 13, further comprising, if a variable quantity of the first capacitance reaches a threshold, generating and outputting a signal representing the non-contact touch.

15. The method of claim 14, further comprising executing the changing of the shield layer and the sensing of the contact touch by supplying the voltage when a variable quantity of the first capacitance reaches a threshold.

16. The method of claim 14, further comprising performing a function corresponding to the signal representing the non-contact touch.

17. The method of claim 13, wherein the electrostatic capacity touch panel further includes x-electrode lines deployed to extend in a first direction, and y-electrode lines electrically insulated from the x-electrode lines and deployed to extend in a second direction substantially perpendicular to the first direction, and wherein at least one of the x-electrode lines and the y-electrode lines is configured as the Rx channel.

* * * * *